US012533431B2

(12) United States Patent
Dreher et al.

(10) Patent No.: US 12,533,431 B2
(45) Date of Patent: Jan. 27, 2026

(54) TREATMENT OF CNS TUMORS

(71) Applicant: Boston Scientific Medical Device Limited, Galway (IE)

(72) Inventors: Matthew R. Dreher, West Conshohocken, PA (US); Alexander Pasciak, Laurel, MD (US); Clifford Weiss, Baltimore, MD (US)

(73) Assignee: Boston Scientific Medical Device Limited, Galway (IE)

( * ) Notice: Subject to any disclaimer, the term of this patent is extended or adjusted under 35 U.S.C. 154(b) by 238 days.

(21) Appl. No.: 16/815,901

(22) Filed: Mar. 11, 2020

(65) Prior Publication Data

US 2020/0289680 A1 Sep. 17, 2020

Related U.S. Application Data

(60) Provisional application No. 62/823,954, filed on Mar. 26, 2019, provisional application No. 62/816,833, filed on Mar. 11, 2019.

(51) Int. Cl.
*A61K 51/12* (2006.01)
*A61K 9/00* (2006.01)
*A61P 35/00* (2006.01)

(52) U.S. Cl.
CPC ........ *A61K 51/1255* (2013.01); *A61K 9/0019* (2013.01); *A61P 35/00* (2018.01)

(58) Field of Classification Search
CPC .... A61K 51/1255; A61K 9/0019; A61P 35/00
USPC ...................................................... 424/1.29
See application file for complete search history.

(56) References Cited

U.S. PATENT DOCUMENTS

| | | | |
|---|---|---|---|
| 849,200 A | 4/1907 | Brinley | |
| 4,350,773 A | 9/1982 | Itagaki et al. | |
| 4,789,501 A | 12/1988 | Day et al. | |
| 8,697,030 B2 | 4/2014 | Peng et al. | |
| 9,119,887 B2 | 9/2015 | Day et al. | |
| 9,539,347 B2 | 1/2017 | Day et al. | |
| 9,682,158 B2 | 6/2017 | Samnick | |
| 9,839,705 B2 | 12/2017 | Day et al. | |
| 10,232,062 B2 | 3/2019 | Stephens et al. | |
| 2007/0053837 A1 | 3/2007 | Merlo et al. | |
| 2012/0070371 A1* | 3/2012 | Day ................... | A61K 51/1255 424/1.29 |
| 2016/0331854 A1 | 11/2016 | Fritz | |

FOREIGN PATENT DOCUMENTS

| | | |
|---|---|---|
| CN | 101513542 A | 8/2009 |
| EP | 0201601 A1 | 11/1986 |
| EP | 2791254 A2 | 10/2014 |
| EP | 3275883 A1 | 1/2018 |
| WO | 8603124 A1 | 6/1986 |
| WO | 2011110589 A1 | 9/2011 |
| WO | 2013087734 A2 | 6/2013 |
| WO | 2015033092 A1 | 3/2015 |
| WO | 2015033093 A1 | 3/2015 |
| WO | 17053398 A1 | 3/2017 |
| WO | 2017037276 A1 | 3/2017 |
| WO | 18028644 A1 | 2/2018 |
| WO | 2018200802 A1 | 11/2018 |
| WO | 2018209346 A1 | 11/2018 |

OTHER PUBLICATIONS

Haldemann et al. J. Nucl. Med. 1994, 1-3 (Year: 1994).*
Murthy et al. RadioGraphics 2005, S41-S55. (Year: 2005).*
Mariani et al. Neurosurgery 2001, 353-358. (Year: 2001).*
Shukla et al. Chin. Clin. Oncol. 2017, 6, 1-12 (Year: 2017).*
Taylor et al. J. Neurosurg. 2004, 100, 810-812. (Year: 2004).*
Simon et al., "Intra-arterial Irradiation of Tumors, a Safe Procedures" Aug. 1971—Presented at the Seventy-first Annual Meeting of the American Roentgen Ray Society.
International Search Report and Written Opinion for the International Patent Application No. PCT/IB2019/055394, mailed Nov. 25, 2019, 11 pages.
Raissi et al., Upper Gastrointestinal Bleed Embolization with Onyx®: The "Tattoo Effect"—2018 Journal of Clinical Imaging Science, 4 pages.
Author Unknown., "Addendum—Axios Metabolic Program—stage 2" Jan. 1, 2021, 6 pages.
Ghia a J et al., "Yttrium-90 Microspheres (Therasphere) in the Treatment of Primary and Metastatic Liver Tumors: A Retrospective Analysis", International Journal of Radiation: Oncology Biology Physics, vol. 78, No. 3, 2266, Nov. 2010.
Andrews et al., "Hepatic Radioembolization with Yttrium-90 Containing Glass Microspheres: Preliminary Results and Clinical Follow-Up" Journal of Nuclear Medicine, vol. 35, No. 10, Sep. 24, 1994.
Caldarola L et al., "Preparation of 32-P Labelled Resin Microspheres for Radiation Treatment of Tumours by Intra-arterial Injection" Minerva Nucleare, vol. 55, May 1964 169-174.
Houle S et al., "Hepatocellular Carcinoma Pilot Trial of Treatment With Y-90 Microspheres", Radiology, vol. 172, No. 3, Sep. 1989, pp. 857-860.
Stefan Kneifel et al., "Individual Voxelwise dosimetry of targeted 90Y-labelled substance p. radiotherapy for malignant gliomas" European Journal of Nuclear Medicine and Molecular Imaging, vol. 34, No. 9, Jan. 31, 2007, pp. 1388-1395.
Paganelli G et al., "Pre-Targeted Locoregional Radioimmunotherapy with 90Y-Biotin in Glioma Patients: Phase 1 Study and Preliminary Therapeutic Results", Cancer Biotherapy and Radiopharmaceuticals, vol. 16, No. 3, Jun. 2001, pp. 227-235.
A Majkowsha-Pilip et al. "Physicochemical and Biological characterization of SubstanceP fragments labeled with 177Lu", European Journal of Nuclear Medicine, vol. 43, No. S1, Sep. 21, 2016, p. S430.

(Continued)

*Primary Examiner* — Michael G. Hartley
*Assistant Examiner* — Sean R Donohue
(74) *Attorney, Agent, or Firm* — Seager, Tufte & Wickhem, LLP (57) ABSTRACT

A method of treating CNS tumors such as gliomas is provided comprising delivering a β-emitting radionuclide containing composition to the tumor via the cerebral vasculature.

16 Claims, 3 Drawing Sheets

(56) References Cited

OTHER PUBLICATIONS

S Kneifel et al., "P594 Voxelwise dosimetry in patients undergoing intracranial brachytherapy with 90Y-substance P using SPECT/CT" European Journal of Nuclear Medicine and Molecular Imaging, vol. 35, No. Suppl.2, Oct. 2008, p. S354.

L Fiedler et al., "Evaluation of Lu-177 Labelled 6A10 Fab as Carbonic Anhydrase 12 Targeting Agent" European Journal of Nuclear Medicine, vol. 44, No. Supple.2, Sep. 11, 2017, pp. S162-S163.

Q Liu et al., "Preliminary Safety Evaluation of 177Lu-DOTA-EB-TATE Radionuclide Therapy in Patients with Advanced Metastatic Neuroendocrine Tumors", European Journal of Nuclear Medicine and Molecular Maging, vol. 45, No. Suppl 1, Oct. 13, 2018, pp. S184.

J Taleb et al., "New Modality of Curietherapy with Holmium Oxyde Submicronic Particles", European Journal of Nuclear Medicine and Molecular Imaging, vol. 36, No. Suppl.2, Aug. 8, 2009, p. S432.

International Search Report and Written Opinion for Application No. PCT/US2020/022103, mailed Jun. 24, 2020, 24 pages.

Westcott, et al., The Development Commercialization And Clinical Context Of Yttrium-90 Radiolabeled Resin And Glass, pp. 1-14, 2016.

Murthy, R., et al., "Yttrium 90 microsphere therapy for hepatic malignancy: devices, indications, technical considerations, and potential complications", Radiographics.2005; 25 (suppl 1): S41 S55 (9 pages).

Haldemann, A R et al., Abstract of "Pretherapeutic radioembolization of CNS tumors: Methods, dosime try and first clinical experience", Journal of Nuclear Medicine, 1994 (3 pages).

* cited by examiner

TREATMENT OF CNS TUMORS

RELATED APPLICATIONS

This application claims the benefit of Provisional Application Ser. No. 62/816,833, filed Mar. 11, 2019 and Provisional Application Ser. No. 62/823,954, filed Mar. 26, 2019, the disclosures of which are herein incorporated herein by reference in their entirety.

FIELD

The present disclosure relates to treatment of CNS cancers using beta-radiation-emitting radionuclides (β-emitting radionuclides) particularly when delivered through the cerebral vasculature. Particularly the present disclosure relates to the use of injectable compositions comprising radionuclide containing substances in the treatment of CNS cancers, more particularly high grade axial brain tumors, including hypervascularised tumors such as gliomas.

BACKGROUND

Central nervous system (CNS) cancers can be very difficult to treat, with high grade gliomas being difficult to remove surgically and often being resistant to radiotherapy and chemotherapy. Glioblastoma multiforme (GBM) is the most common and most aggressive malignant cancer of the central nervous system. Current standard of care therapy is external beam radiotherapy (EBRT) coupled with chemotherapy, with relatively poor outcomes.

SUMMARY

The present disclosure relates to treatment of CNS cancers using beta-radiation-emitting radionuclides (β-emitting radionuclides) particularly when delivered through the cerebral vasculature.

In various aspects, the present disclosure provides methods of treating a patient in need of therapy for a CNS tumor comprising selectively administering a β-radiation emitting composition to the cerebral vasculature. In some embodiments, the CNS tumor may be a glioma. In some embodiments, the CNS tumor may be an intra-axial brain tumor. In some embodiments, the CNS tumor may be a meningioma. In some embodiments, the CNS tumor may be a brain metastasis.

In some embodiments, which may be used in conjunction with the any of the above aspects and embodiments, the β-radiation emitting composition is further localized in a T2 hyperintense region of the brain. In this regard, the localization to the T2 hyperintense region surrounding a tumor is in addition to the tumor targeting itself. This additional coverage may be advantageous, for example, in cases where a tumor extends into the T2 hyperintense region, yet does not appear upon imaging.

In some embodiments, which may be used in conjunction with the any of the above aspects and embodiments, the β-radiation composition contains one or more radionuclides selected from $^3$H, $^{14}$C, $^{32}$P, $^{59}$Fe, $^{47}$Ca, $^{89}$Sr, $^{90}$Y, $^{131}$I, $^{153}$Sm, $^{177}$Lu7, $^{166}$Ho, and $^{169}$Er.

In some embodiments, which may be used in conjunction with the any of the above aspects and embodiments, the β-radiation emitting composition comprises particles that contain a β-radiation emitting radionuclide, which may have an average diameter of 1 to 100 μm, among other values. In certain embodiments, the particles are oil, glass or polymer particles that contain a β-radiation emitting radionuclide and are of average diameter of 1 to 100 μm. In some of these embodiments, the average diameter is 10 to 50 μm, more particularly, 15 to 35 μm. In some of these embodiments, the diameter of the particles is from 15 to 35 μm, more particularly, from 20 to 30 μm.

In some embodiments, which may be used in conjunction with the any of the above aspects and embodiments, the β-radiation emitting particles contain one or more radionuclides selected from $^3$H, $^{14}$C, $^{32}$P, $^{59}$Fe, $^{47}$Ca, $^{89}$Sr, $^{90}$Y, $^{131}$I, $^{153}$Sm, $^{177}$Lu7, $^{166}$Ho, and $^{169}$Er.

In some embodiments, which may be used in conjunction with the any of the above aspects and embodiments, the β-radiation emitting particles are glass particles or polymer particles.

In some embodiments, which may be used in conjunction with the any of the above aspects and embodiments, the β-radiation emitting particles are aluminosilicate glass particles containing yttrium, for instance, the glass particles may be formed of a glass derived from a mixture of 35-45% $Y_2O_3$, 15-25% $Al_2O_3$ and 35-45% $SiO_2$, such as glass particles formed of a glass derived from a mixture of approximately 40% $Y_2O_3$, approximately 20% $Al_2O_3$ and approximately 40% $SiO_2$, among other possibilities. In some instances, at least a proportion of the yttrium in the glass is converted to $^{90}$Y by exposure to radiation.

In some embodiments, which may be used in conjunction with the any of the above aspects and embodiments, the particles are pure β-radiation emitting particles that irradiate substantially 100% β-radiation.

In some embodiments, which may be used in conjunction with the any of the above aspects and embodiments, the particles have a specific activity ranging from 0.05 to 0.005 GBq/mg when administered, more particularly, a specific activity ranging from 0.0231 to 0.03894 GBq/mg when administered.

In other aspects, the present disclosure provides injectable compositions that comprise a suspension of a β-radiation emitting substance in an aqueous liquid for use in treatment of CNS cancer. In some embodiments, the substance contains one or more radionuclides selected from $^3$H, $^{14}$C, $^{32}$P, $^{59}$Fe, $^{47}$Ca, $^{89}$Sr, $^{90}$Y, $^{131}$I, $^{153}$Sm, $^{177}$Lu7, $^{166}$Ho, and $^{169}$Er.

In some embodiments, the substance may comprise particles, such as oil, glass or polymer particles, which average diameter of, for example, 1 to 100 μm, among other possible values.

In some embodiments, the particles are β-radiation emitting particles that contain one or more radionuclides selected from $^3$H, $^{14}$C, $^{32}$P, $^{59}$Fe, $^{47}$Ca, $^{89}$Sr, $^{90}$Y, $^{131}$I, $^{153}$Sm, $^{177}$Lu7, $^{166}$Ho, and $^{169}$Er.

In some embodiments, the particles comprise insoluble glass microspheres having yttrium-90 ($^{90}$Y) as an integral constituent of the glass, which may, for example, have a diameter that ranges from 20 to 30 μm, among other possible values. In certain embodiments, each milligram of the glass microspheres may contain between 22,000 and 73,000 microspheres.

In some embodiments, which may be used in conjunction with the any of the above aspects and embodiments, the β-radiation emitting particles are supplied in sterile, pyrogen-free water.

Additional aspects and embodiments will become apparent to those skilled in the art upon review of the Detailed Description to follow.

DETAILED DESCRIPTION

As previously noted, the present disclosure relates to treatment of CNS cancers using beta-radiation-emitting radionuclides (β-emitting radionuclides) particularly when delivered through the cerebral vasculature. Particularly the present disclosure relates to the use of injectable compositions comprising radionuclide containing substances in the treatment of CNS cancers, more particularly high grade axial brain tumors, including hypervascularised tumors such as gliomas.

In a preferred embodiment, the present disclosure also relates to the use of injectable compositions comprising radionuclide containing substances in the treatment of CNS cancers, more particularly (1) intra-axial brain tumors, including, but not limited to primary axial brain tumors, such as astrocytoma, primary CNS lymphoma, glioblastoma, and glioma (such as ganglioglioma or oligodendroglioma), (2) extra-axial tumors, such as meningioma, and (3) secondary brain tumors arising for other locations in the body (i.e., brain metastases).

CNS cancers can be very difficult to treat, with high grade gliomas being difficult to remove surgically and often being resistant to radiotherapy and chemotherapy. Glioblastoma multiforme (GBM) is the most common and most aggressive malignant cancer of the central nervous system. Current standard of care therapy is external beam radiotherapy (EBRT) coupled with chemotherapy, with relatively poor outcomes. Researchers at the Johns Hopkins Comprehensive Brain Tumor Center have developed the GliaSite Radiation Therapy System (RTS), which delivers radiation from within the hole created by the surgical removal of a malignant brain tumor. Internal radiation 'brachytherapy' treatment using manually inserted encapsulated gamma-emitters is an established treatment for cancer of tissues such as prostate and has been trialled for GBM.

GBM is a hypervascular tumor that always has an infiltrative tumor component. This precludes operative cure in virtually all cases, making GBM very challenging to treat. Poor surgical outcomes also distinguish GBM from solid abdominal organ tumors (HCC, RCC) in that surgical resection has a very limited role. Following consideration of a surgical treatment option for GBM, the standard of care is fractionated, conformational external-beam radiation therapy (EBRT).

Typically, EBRT involves 35 daily fractions of 1.8 Gy that are delivered for a total of 63 Gy to include tumor plus a 1-2 cm margin from enhancing rim. Radiation therapy has been used in the treatment of GBM since the 1940's, with preliminary radiobiologic thresholds identified in the 1970's demonstrating modest survival increases of 2.3× at 60 Gy. Modern EBRT treatment using stereotactic techniques along with dose escalation protocols have not been reproducibly effective in increasing survival (see Gzell, C., Back, M., Wheeler, H., Bailey, D. & Foote, M. Radiotherapy in Glioblastoma: the Past, the Present and the Future. *Clinical Oncology* 29, 15-25 (2017). However, combination EBRT with chemotherapy (e.g., temozolomide, an alkylating agent) has been the standard of care since 2002 following data from Stupp et al demonstrating a 16 month median survival (see Stupp, R. et al. Promising survival for patients with newly diagnosed glioblastoma multiforme treated with concomitant radiation plus temozolomide followed by adjuvant temozolomide. *J. Clin. Oncol.* 20, 1375-1382 (2002)).

Apart from EBRT, manual low-dose rate brachytherapy has been explored in the treatment of GBM. $^{125}$I and more recently $^{131}$Cs brachytherapy has been used in salvage after recurrence and in conjunction with standard external beam radiation therapies. Overall survival up to 28.5 months has been reported in some series for new diagnosis of GBM (see Barbarite, E. et al. The role of brachytherapy in the treatment of glioblastoma multiforme. *Neurosurgical review* (2016). doi:10.1007/s10143-016-0727-6 and Schwartz, C. et al. Outcome and toxicity profile of salvage low-dose-rate iodine-125 stereotactic brachytherapy in recurrent high-grade gliomas. *Acta neurochirurgica* 157, 1757-64—discussion 1764 (2015)).

However, both EBRT and manual brachytherapy using low-energy gamma emitters are associated with high radiation doses to healthy brain parenchyma, resulting in a high frequency of neurological toxicity. To combat neurotoxicity, advanced techniques such as proton or X-ray microchannels, where a field of microbeams is used to irradiate tumor, has shown the potential for sparing of uninvolved parenchyma (see Girst, S. et al. Improved normal tissue protection by proton and X-ray microchannels compared to homogeneous field irradiation. *Phys Med* 31, 615-620 (2015)).

High grade gliomas are by definition hypervascular enhancement on MR which differentiates low grade (WHO I and II) from high-grade gliomas (WHO III and IV). Numerous angiogenic factors have been discovered in association with varying classifications of high grade glioma (see Hanif, F., Muzaffar, K., Perveen, K., Malhi, S. M. & Simjee, S. U. Glioblastoma Multiforme: A Review of its Epidemiology and Pathogenesis through Clinical Presentation and Treatment. *Asian Pacific journal of cancer prevention: APJCP* 18, 3-9 (2017).

Figure 1:
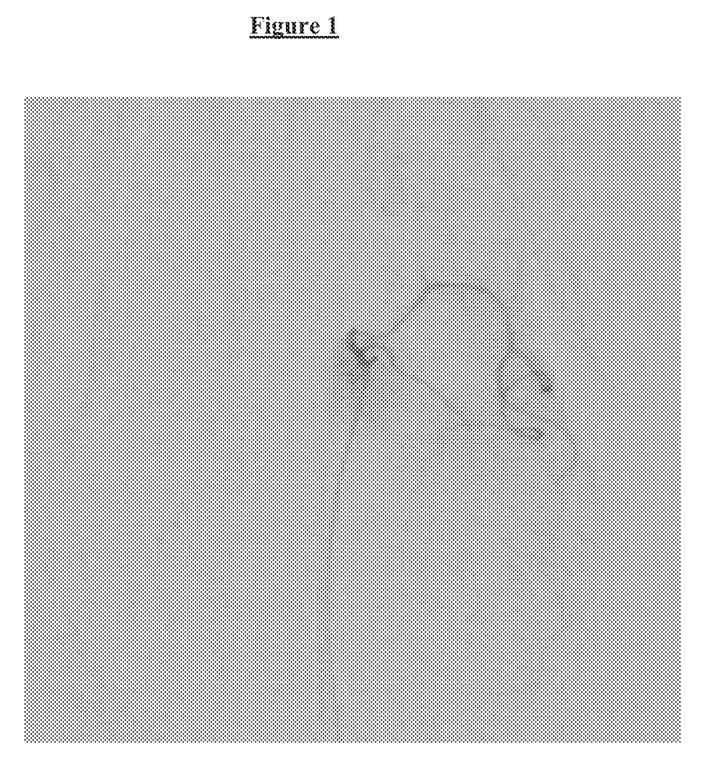
FIG. 1 shows an angiogram depicting contrast agent injected into the left middle cerebral artery of a healthy research dog.
Figure 2:
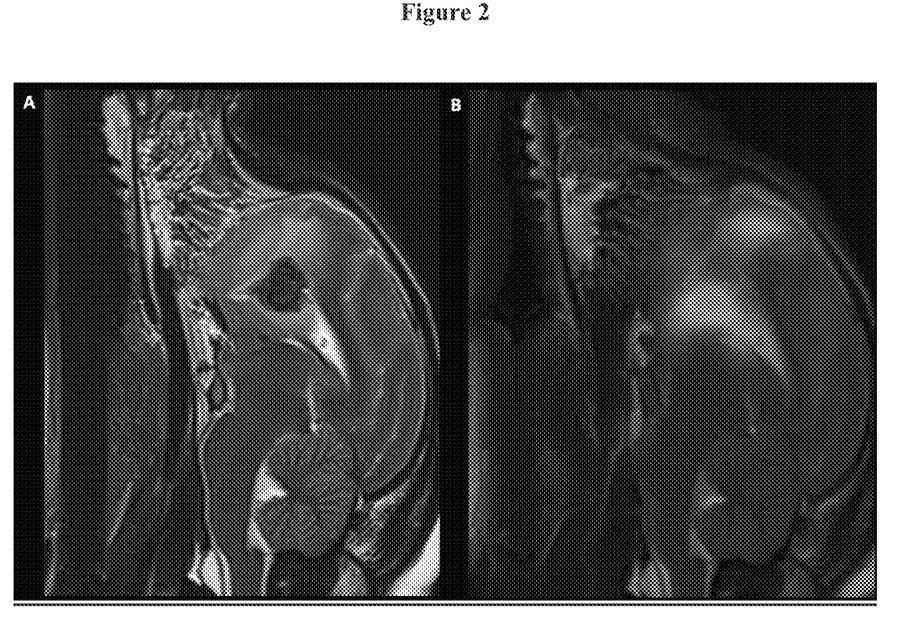
FIG. 2 shows a) Pre-procedural MRI and b) Post-treatment Y-90 PET/CT fused with pre-procedural MRI. Fused images show correlation between MRI T2 enhancing periphery and Y-90 PET deposition in the first canine brain tumor patient treated.
Figure 3:
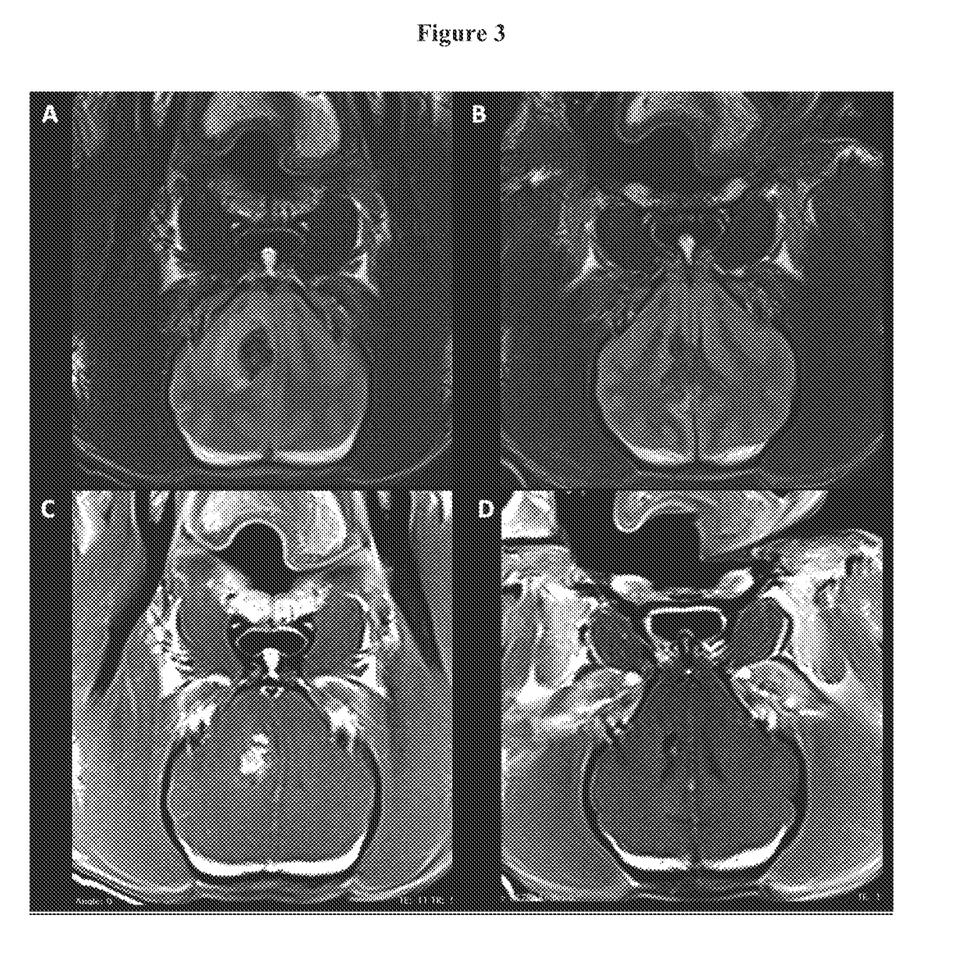
FIG. 3 shows a) T2 FLAIR MRI 1 month prior to therapy, b) T2 FLAIR MRI 1 month post therapy, c) T1 post-contrast MRI 1 month prior to therapy, d) T1 post-contrast MRI 1 month post therapy. At 1 month post therapy, there is a decrease in lesional size with resolution of perilesional edema and absence of contrast enhancement. Resolution of midline shift without evidence cortical atrophy was also noted.

GBM typically presents as a hypercellular, enhancing mass. In fact, contrast enhancement on CT may be in excess of 20 times higher in tumor compared to normal brain paranchyma (FIG. 1). The challenging aspect to GBM therapy is the relatively hypocellular infiltrative disease that is always present. Although the infiltrative component poses treatment challenges, recurrences following EBRT typically occur centrally, within 1-2 cm of the original margin of tumor enhancement.

GBM has a well-described dose-response relationship to radiation therapy. Brachytherapy, the placement of a sealed radiation source into the tumor, has shown efficacy in several reports but heterogeneous overall survival reflects rates of neurological toxicity approaching 50%. The high neurological toxicity in manual branchytherapy is likely due to a wide dose margin resulting from the use of low-energy gamma emitters. This toxicity can be partially mitigated in stereotactic EBRT through avoidance of critical neurologic structures. See Corwin, D. et al. Toward Patient-Specific, Biologically Optimized Radiation Therapy Plans for the Treatment of Glioblastoma. *PLoS ONE* 8, e79115 (2013).

The present inventors have postulated that transarterial radio-embolization (TARE), an established treatment for treating liver tumors, may be a potentially viable improved treatment for CNS cancers of the brain. GBM has a well-described dose-response relationship to radiation therapy and while the brain does not have a dual blood supply like the liver, GBM are by definition hypervascular (10:1 contrast enhancement is possible for GMB). This should limit the concentration of arterial administered substances in normal brain parenchyma and as modern EBRT specifically targets hypervascular areas with higher doses to improve response with some degree of success a similar effect might be expected with TARE.

Whilst manual brachytherapy using low energy gamma-emitters ($^{125}$I, $^{131}$Cs) is known for GBM, it is associated with high neurotoxicity from high doses to nearby neurological structures. In order to mitigate such effects, the present inventors have postulated that radiation emitted from radionuclides placed in the cancer vasculature having a limited definitive range will limit dose and damage to normal tissue. Particularly they have determined that β-radiation emitting radionuclides, particularly when in a form suitable for TARE, might have the correct profile to limit dose to nearby normal tissue.

Super selective angiography of GBM was described nearly 20 years ago and has been reported numerous times since. See Tomura, N. et al. Superselective angio-CT of brain tumors. *AJNR Am J Neuroradiol* 17, 1073-1080 (1996). Superselective intra-arterial cerebral infusion (SIACI) has been used with some modest success with pharmaceutical drug combination delivery (See Riina H A, Knopman J, Greenfield J P, et al. Balloon-assisted superselective intra-arterial cerebral infusion of bevacizumab for malignant brainstem glioma. A technical note. Interventional Neuroradiology. 2010; 16:71-76)

The present inventors have postulated that with the much narrower dose deposition margin of β-radiation compared to that from gamma emitters such as $^{125}$I and $^{131}$Cs used in manual brachytherapy, uninvolved parenchyma could be spared. $^{90}$Y is the highest energy pure β-emitter commonly used in radionuclide therapy. While alternatives to $^{90}$Y with lower energy β-emissions such as $^{131}$I or $^{177}$Lu may spare more tissue around a ring-enhancing GBM, the lower margin may also fail to effectively treat the cellular and/or acellular infiltrative tumor component that is often present. So whilst the inventors conceive that employment of any β-emitting radionuclide falls within the scope of the present disclosure, they particularly envisage use of substances containing high energy radionuclides, and particularly those in use in TARE such as $^{90}$Y and $^{166}$Ho.

Recently, tailored EBRT algorithms have shown promise. This technique is predicated on giving higher doses to the enhancing tumor component, assuming the areas with highest vascularity represent areas of higher cellularity. Lower doses are administered to areas of T2/FLAIR hyperintensity, assuming this reflects infiltrative tumor or edema with lower-cellularity. Tailored EBRT protocols treat areas of enhancement with high doses (100-130 Gy) to improve response, without the drastic increase in absorbed dose to normal parenchyma associated with high-dose treatment of the entire mass. The present inventors postulated that higher energy β-radiation emitters, such as from $^{90}$Y radionuclide, might match or improve on this. $^{90}$Y has been shown in biopsy specimens following treatment for liver cancer to deliver massive (~1000 Gy) absorbed doses to highly vascular tumor periphery, and would potentially improve upon EBRT in this respect.

Other techniques in EBRT to spare uninvolved brain parenchyma, such as X-ray or proton microchannels, have been shown to reduce neurologic toxicity similar to comparisons that have been made with the difference in toxicity in liver treatment (which can be a factor of 3-5) when glass $^{90}$Y microspheres and EBRT are compared. In particular, sparse distribution of glass $^{90}$Y microspheres in normal brain parenchyma might spare this tissue and mechanistically may work similar to X-ray and proton microchannels currently the subject of significant research in EBRT.

Particularly preferred compositions for use in the method of the present disclosure comprise radionuclide containing substances that are minimally embolic in format, such as oils, polymers or glass microspheres, Minimally embolic β-radiation-emitting radionuclide containing particles may comprise radionuclides selected from $^{3}$H, $^{14}$C, $^{32}$P, $^{59}$Fe, $^{47}$Ca, $^{89}$Sr, $^{90}$Y, $^{131}$I, $^{153}$Sm, $^{177}$Lu7, $^{166}$Ho, and $^{169}$Er. More preferred are relatively pure β-emitters, selected from $^{89}$Sr, $^{166}$Ho, $^{153}$Sm, $^{177}$Lu, $^{169}$Er and $^{90}$Y. Most preferred is $^{90}$Y radionuclide, in the form of glass or polymers microspheres. Iodinated $^{131}$I oils, such as lipiodol may also be employed in some cases.

In one embodiment, a non-radioactive nuclide may be administered in a microsphere and delivered to a tumor and then the non-radioactive nuclide activated in situ to cause the nuclide to become a radionuclide. In a preferred embodiment, the activation is performed using an electron beam. In a more preferred embodiment, the activation is performed by directing the electron beam to the perfused target volume or therapeutic site.

In one embodiment, the radionuclide may be externally irradiated (that is, irradiated in situ) instead of being irradiated before transportation. In a preferred embodiment, in situ irradiation can be performed using an electron beam. In a more preferred embodiment, the irradiation is performed by directing the electron beam to the perfused target volume or therapeutic site.

Delivery of β-radiation emitting substances, such as minimally embolic oils or microspheres in a super selective fashion should be technically feasible in CNS tumors of the brain, such as GBM, particularly since there is little variability in cerebral vascular supply and perfusion as compared to conventionally treated hepatic vascular anatomy. Super selective delivery would also have the advantage of further limiting absorbed dose to normal brain parenchyma. See Tomura, N. et al. Superselective angio-CT of brain tumors. *AJNR Am J Neuroradiol* 17, 1073-1080 (1996).

TheraSphere™, available from Biocompatibles UK Ltd, consists of insoluble glass microspheres where yttrium-90 ($^{90}$Y) is an integral constituent of the glass. The glass is an aluminosilicate glass containing yttrium, derived from a mixture of 35-45% $Y_2O_3$, 15-25% $Al_2O_3$ and 35-45% $SiO_2$ more specifically it is approximately 40% $Y_2O_3$, approximately 20% $Al_2O_3$ and approximately 40% $SiO_2$. At least a proportion of the yttrium in the glass has been converted to $^{90}$Y by exposure to radiation.

The mean sphere diameter ranges from 20 to 30 μm. Each milligram contains between 22,000 and 73,000 microspheres. TheraSphere is supplied in 0.6 mL of sterile, pyrogen-free water contained in a 1.0 mL vee-bottom vial secured within a clear acrylic vial shield. TheraSphere is available in six dose sizes: 3 GBq (81 mCi), 5 GBq (135 mCi), 7 GBq (189 mCi), 10 GBq (270 mCi), 15 GBq (405 mCi) and 20 GBq (540 mCi). Custom dose sizes are also available.

In one embodiment, smaller dose sizes are used, or portions of the above-mentioned dose sizes are used. In a preferred embodiment, an administration may use 5%, 10%, 15%, 20%, 25%, 30%, 35%, 40%, 45%, 50%, 55%, 60%, 65%, 70%, 75%, 80%, 85%, 90%, or 95% of any of the above-mentioned dose sizes. In a more preferred embodiment, an administration uses 5%, 10%, 15%, 20%, 25%, 30% of any of the above-mentioned dose sizes. In a most preferred embodiment, an administration uses 5% or 10% of any of the above-mentioned dose sizes.

TheraSphere™ has a twelve day shelf life. In one embodiment, reference is made to the specific activity of the composition at calibration. In one embodiment, the day of calibration is referred to as day zero, days one to seven following the calibration day are referred to as the first week, and days eight through twelve are referred to as the second week. In one embodiment, calibration refers to day zero at time zero. In one embodiment, time zero on day zero is noon, United States Eastern Standard Time.

In a preferred embodiment, the preferred treatment window is from Wednesday of the first week (which may also be referred to as first week Wednesday) to Tuesday of the second week (which may also be referred to as second week Tuesday). In a more preferred embodiment, the preferred treatment window is from first week Thursday to first week Friday.

A preassembled single use TheraSphere Administration Set is provided for each dose. The TheraSphere Administration Accessory Kit is supplied to new user sites. The kit includes re-usable accessories including an acrylic box base, top shield, removable side shield, bag hook and a RADOS RAD-60R radiation dosimeter (or equivalent).

The yttrium-90, a pure β-emitter, decays to stable zirconium-90 with a physical half-life of 64.1 hours (2.67 days). The average energy of the β-emissions from yttrium-90 is 0.9367 MeV. Following embolization of the yttrium-90 glass microspheres in tumorous tissue, the β-radiation emitted provides a therapeutic effect. As with other radionuclide containing materials for use in the method of the present disclosure, once TheraSphere has been administered, it loses its radioactivity in time and cannot be reused.

The microspheres are delivered into the target, through a catheter placed into the artery that supplies blood to the tumor. The microspheres, being unable to pass through the vasculature of due to arteriolar capillary blockade, are trapped in the tumor and exert a local radiotherapeutic effect with some concurrent damage to surrounding normal tissue. See Campbell, A. M., Bailey, I. H. & Burton, M. A. Tumour dosimetry in human liver following hepatic yttrium-90 microsphere therapy. *Phys Med Biol* 46, 487-498 (2001).

TheraSphere™ is indicated for radiation treatment or as a neoadjuvant to surgery or transplantation in patients with unresectable HCC who can have placement of appropriately positioned hepatic arterial catheters.

Another β-radiation emitting substances include Sirspheres, ion exchange resin beads bearing $^{90}$Y radionuclide. These beads have diameter of 20-60 μm and are available from Sirtex Medical. Sirspheres may be contemplated for use in the present disclosure. In one embodiment, the Sirspheres would be modified to increase their specific activity in order to increase the therapeutic effect exerted during their use. In a preferred embodiment, this increase in specific activity can be accomplished by increasing the loading of $^{90}$Y onto the resin.

A further β-radiation emitting substance is $^{131}$I iodinated lipiodol, the use of which is described by the European Association for Nuclear Medicine monograph and Lipiodol is available from Guerbet group.

In its broadest aspect, the method of the present disclosure comprises the administration of β-radiation emitting substances selectively to the vasculature supplying a CNS tumor. Particularly the method administers an injectable pharmaceutical composition comprising β-radiation emitting particles, which are for example liquid, polymer or glass, in an aqueous carrier, such as saline or sterile water. In one embodiment, the carrier is any injectable medium. In one embodiment, the carrier is or comprises 5% dextrose in water. In one embodiment, the carrier is or comprises ethanol. In one embodiment, the carrier is or comprises iodinated contrast.

More preferably the method administers said composition to the vasculature supplying a CNS tumor in the brain. Whilst the beta-radiation emitting particles may in theory also produce some other radiation, as with radionuclides such as $^{3}$H, $^{14}$C, $^{32}$P, $^{59}$Fe, $^{47}$Ca, the present inventors believe that it is much preferred to use higher energy pure β-emitters such as $^{89}$Sr, $^{166}$Ho, $^{153}$Sm, $^{177}$Lu, $^{169}$Er and $^{90}$Y, and most preferably envisage that particles containing $^{90}$Y will provide the most appropriate therapy.

Preferred are compositions containing $^{90}$Y radionuclide in glasses or polymers, most preferably as glass particles and more preferably of average diameter of 1 to 100 μm. More preferably the particles should be of average diameter 10 to 50 μm, still more preferably of the average diameter 15 to 35 μm, e.g. 20 to 30 μm.

These particles are most preferably and conveniently supplied in aqueous suspension e.g. in sterile water or saline.

The administration of particles is preferably preceded with steroid, e.g. a prednisone dosage of 4 mg/kg (IV or PO) initially dosing e.g. followed by e.g. 2 mg/kg daily PO initiated on the day of cerebral artery radio-embolization and continuing at 2-4 mg/kg with the potential for a tapering dose until clinicians feel it is safe to discontinue (based on post-treatment MRI).

The method of the present disclosure particularly deploys a catheter to the cerebral artery supplying the CNS cancer, e.g., a tumor. More preferred if the tumor is located in one cerebral hemisphere or localised to a sub-zone of this, the catheter is deployed to the particular branch of the cerebral artery that supplies the tumor.

In a preferred embodiment, the method of the present disclosure deploys a catheter through the radial artery.

Typically, a guide catheter is advanced over a wire e.g., inserted via the femoral artery into the aorta and advanced into the carotid artery, possibly using fluoroscopy. Preferably angiographic evaluation with contrast agents, e.g. iodinated contrast agents, will be deployed, and the cerebral artery branch primarily supplying the tumor is identified and accessed in that manner.

The catheter is preferably a microcatheter, one example of a suitable microcatheter is provided by Stryker, the Excelsior SL-10 1.7F (0.6 mm diameter). Preferred catheters do not employ a balloon to isolate the vasculature during administration of the β-emitting radionuclide containing composition. In some circumstances such a balloon, possible associated with a balloon catheter, may be preferred by the clinician. The present inventors however believe that with use of suitable sized particle containing composition this will not be necessary.

Preferably, the microcatheter is advanced as near to the tumor as possible without causing physical damage to the vessel. This allows the placement of the β-emitting composition to be as selective as possible, e.g. preferably providing primarily localisation, and preferably some embolization of the tumor with limited perfusion of normal brain parenchyma. Anti-vasospasm medication is preferably administered e.g. Nitroprusside (100 mcg), injected intra-arterially, to prevent vasospasm during selective artery catheterization.

In one embodiment, prior to treatment, a pre-treatment MRI is preferably reviewed to determine tumor volume. The study physicist will perform treatment planning at an expected preferred tumor absorbed-dose of 30-200 Gy, preferably 50-200 Gy, more preferably 80-180 Gy and most preferred 100-150 Gy. This treatment dose is infused into the tumor through the microcatheter. After the microsphere infusion is completed, the wire, catheter, and sheath are removed. For closure, manual pressure is be held until hemostasis is achieved or a closure device will be utilized.

In one embodiment, the target treatment volume is understood as being the region perfused by the administration. In one embodiment, this target treatment volume includes both tumor and normal tissue. In one embodiment, a practitioner may use anatomical imaging and/or intraprocedural cone beam computed tomography (CBCT) with contrast enhancement to determine the target treatment volume.

In one embodiment, the study physicist will perform treatment planning at an expected treatment volume dose of 10-1,000 Gy, preferably of 50-200 Gy, more preferably of 80-180 Gy and most preferably of 100-150 Gy. As a person having ordinary skill in the art would understand, the tumor-absorbed dose is anticipated to be higher than the normal tissue absorbed dose; without wishing to be bound by theory, this may be due to hypervascularity of the tumor.

In one embodiment, the desired dose in Gy can be calculated based upon target volume using software similar to that of TheraSphere™ iDOC™, using Treatment Window Illustrator, or using the MIRD Schema. In one embodiment, the desired dose in Gy can be calculated based upon target treatment volume using software similar to that of TheraSphere iDOC™, using Treatment Window Illustrator, or using the MIRD Schema.

In one embodiment, the desired absorbed dose in Gy can be calculated based upon target treatment volume using the MIRD Schema. In one embodiment, the desired absorbed dose in Gy can be calculated based upon target treatment volume using software similar to that of TheraSphere iDOC™ or Treatment Window Illustrator.

In one embodiment, the desired absolute activity (in Bq or GBq) can be calculated based upon target treatment volume using the MIRD Schema. In one embodiment, the desired absolute activity (in Bq or GBq) can be calculated based upon target treatment volume using software similar to that of TheraSphere iDOC™ or Treatment Window Illustrator. After closure and hemostasis is achieved, the subject will be preferably transported to PET/CT for scanning.

Anesthesia is maintained e.g. with IV boluses of propofol. The PET-CT scan will be performed under general anaesthesia, e.g. with isoflurane, with mechanical ventilation. PET/CT will detect radioactive emissions from the administered particles, i.e., no additional injection of radioactivity will be required. In one embodiment, the scanning can be performed without anesthesia.

After PET/CT, the subject is extubated when a swallow reflex has returned. Potential post-operative pain will be managed with e.g. subcutaneous/IM injections of analgesic, e.g. buprenorphine (0.005-0.02 mg/kg q 8-12 hrs). The subject may be allowed to return home when awake and normothermic, following radiation safety survey. After the procedure and imaging, subjects can be discharged the same day. The clinician should look for behaviour changes or signs of seizure for follow up, depending on the severity of these issues, a clinical decision will be made as to the likelihood of herniation based on subject behaviour, presence of seizure, cranial nerve deficit and physical appearance, and investigators may recommend treatment to reduce intracerebral pressure.

Subjects typically receive post-treatment MRI imaging under anaesthesia preferably no sooner than 1 week after treatment and no more often than once per week to assess for signs of inflammation, edema and other neurological changes. Sedation and anaesthesia will be similar to what is described for the cerebral artery radio-embolization procedure above. In one embodiment, the imaging can be performed without anaesthesia.

EXAMPLES

The present disclosure will now be described by reference to the following non-limiting illustrative examples. Further examples will occur to those skilled in the art in the light of these.

Experimental Rational:

There are no suitable large research animal models for glioblastoma multiforme (GMB) that represent features of human brain tumors. These tumors develop spontaneously in humans, but they are also common in several dog breeds. The dog cancer models with naturally occurring high-grade axial brain tumors, including GBM are clinically highly relevant to human cancers and exhibit typical histopathological characteristics, including pseudo-palisading necrosis, neovascularization and endothelial proliferation and inflammatory cell infiltration. See 10. Schiffman J D, Breen M: Comparative oncology: what dogs and other species can teach us about humans with cancer. *Philos Trans R Soc Lond B Biol Sci* 2015, 370.

Advantageously the use of client-owned animals with spontaneously occurring tumors allows a minimal use of research animals, whilst potentially benefitting the client animals.

Disease evaluation was performed prior to enrolment of animals in the study following the standard of care at the Center for Image-Guided Animal Therapy at Johns Hopkins Medicine. Evaluation included (i) veterinary neurological exam, (ii) blood work (CBC, chemistry panel) and MRI with contrast.

Inclusion in the study was dependent on review of MRI and identification of tumor characteristics appropriate for $^{90}$Y therapy. Such characteristics include tumors perfused predominantly from one vascular territory and no bi-hemispherical involvement.

Research dogs were employed as controls for safety and client dogs presenting at clinic with spontaneous canine glioma of one hemisphere only were used for active treatment arm.

Results:

The research dog treatments went well with significant absorbed dose delivered to the normal brain. Overall, the research dogs tolerated the treatment well.

Two glioma cases had been treated at patent application filing date and both experiences were similar in terms of procedural imaging impressions. The tumor was treated from the carotid artery with aim of covering the half of the brain (right/left) containing the tumor. Some perfusion crosses the midline so it is a little more than half. The angiograms were unremarkable. We expected to see tumor hyper-vascularity or a blush but we could not easily identify the tumor. Post-$^{90}$Y PET demonstrated good uptake in the T2 hyperintense (Flair images) regions of the brain that surround the tumor as well as the tumor itself. It was surprising to achieve so much localization to this tumor region of the brain based on the angiogram.

In the following example, TheraSphere™ was calibrated at noon (U.S. Eastern Standard Time) on Sunday, which is understood to be day zero. In the following example, TheraSphere™ was calibrated as having a specific activity of 0.11 GBq/mg (±10%) at calibration.

The first test dog was treated with a second week Thursday dose of $^{90}$Y TheraSphere™ (less radioactive—two weeks after delivery) and experienced transient ischemic effects following therapy. The second dog was treated with a first week Friday dose at ~2× higher activity and ~2× less microspheres. The dog having the higher activity lower number of beads did not experience noticeable transient ischemic effects following therapy. The higher specific activity microspheres likely limit the embolic/ischemic effect in the brain. In this regard, embolization of brain vasculature is widely viewed as negative as it may lead to transient ischemic effects or stroke. The risk of negative effects of embolization should be mitigated by using smaller and fewer microspheres while delivering therapeutic levels of radiation, which may be achieved by using small and high specific activity (activity per gram) microspheres.

By post $^{90}$Y PET, the first dog's tumor dose was 35 Gy and normal tissue does was 18.6 Gy. Tumor dose might be higher due to spatial resolution limitations of PET. The second dog's tumor dose was 115 Gy and normal tissue was 23.5 Gy. This separation of tumor and normal tissue with dog 2 is excellent and likely much better than can be typically achieved with external beam radiation. Target tumor dose for external beam is ~60 Gy. The short penetration of beta-radiation and great tumor to normal ratio should spare the normal tissue of high-absorbed doses. The first dog has demonstrated a complete response approximately 1 month after therapy. The second dog is 11 days out with no symptoms.

The invention claimed is:

1. A method of treating a patient in need of therapy for a CNS tumor comprising selectively administering an effective amount of a β-radiation emitting composition to the cerebral vasculature, wherein the CNS tumor is a glioblastoma multiforme, wherein the β-radiation emitting composition comprises minimally embolic glass particles containing a β-radiation emitting radionuclide and having an average diameter of 10 to 50 μm, wherein the β-radiation emitting composition is administered at an expected tumor absorbed-dose of 30-100 Gy, wherein each mg of the particles contains between 22,000 and 73,000 microspheres, and wherein the particles have a specific activity ranging from 0.0231 to 0.05 GBq/mg when administered.

2. The method as claimed in claim 1 wherein the β-radiation emitting composition is further localized in a T2 hyperintense region of the brain.

3. The method as claimed in claim 1 wherein the β-radiation composition contains one or more radionuclides selected from $^{3}$H, $^{14}$C, $^{32}$P, $^{59}$Fe, $^{47}$Ca, $^{89}$Sr, $^{90}$Y, $^{131}$I, $^{153}$Sm, $^{177}$Lu, $^{166}$Ho, and $^{169}$Er.

4. The method as claimed in claim 1 wherein the average diameter is 15 to 35 μm.

5. The method as claimed in claim 1 wherein the diameter of the particles is from 15 to 35 μm.

6. The method as claimed in claim 1 wherein the diameter of the particles is from 20 to 30 μm.

7. The method as claimed in claim 1 wherein the β-radiation emitting particles contain one or more radionuclides selected from $^{3}$H, $^{14}$C, $^{32}$P, $^{59}$Fe, $^{47}$Ca, $^{89}$Sr, $^{90}$Y, $^{131}$I, $^{153}$Sm, $^{177}$Lu, $^{166}$Ho, and $^{169}$Er.

8. The method as claimed in claim 7 wherein the beta-radiation emitting particles contain a β-radiation emitting radionuclide selected from $^{89}$Sr, $^{166}$Ho, $^{153}$Sm, $^{177}$Lu, $^{169}$Er and $^{90}$Y.

9. The method as claimed in claim 7 wherein the β-radiation emitting particles contain $^{90}$Y radionuclide.

10. The method as claimed in claim 1 wherein the particles are aluminosilicate glass particles containing Yttrium.

11. The method as claimed in claim 1 wherein the glass particles are formed of a glass derived from a mixture of 35-45% $Y_2O_3$, 15-25% $Al_2O_3$ and 35-45% $SiO_2$.

12. The method as claimed in claim 1 wherein the glass particles are formed of a glass derived from a mixture of approximately 40% $Y_2O_3$, approximately 20% $Al_2O_3$ and approximately 40% $SiO_2$.

13. The method as claimed in claim 1 wherein at least a proportion of the yttrium in the glass has been converted to $^{90}$Y by exposure to radiation.

14. The method as claimed in claim 1 wherein the particles are pure β-radiation emitting particles wherein the particles irradiate substantially 100% β-radiation.

15. The method as claimed in claim 1 wherein the particles have a specific activity ranging from 0.0231 to 0.03894 GBq/mg when administered.

16. A method of treating a patient in need of therapy for a CNS tumor comprising selectively administering an effective amount of a β-radiation emitting composition to the cerebral vasculature, wherein the CNS tumor is a glioblastoma multiforme, wherein the β-radiation emitting composition comprises minimally embolic glass particles containing a β-radiation emitting radionuclide and having an average diameter of 15 to 35 μm, wherein the particles are aluminosilicate glass particles containing yttrium, wherein at least a proportion of the yttrium in the glass has been converted to $^{90}$Y by exposure to radiation, wherein the β-radiation emitting composition is administered at an expected tumor absorbed-dose of 30-100 Gy, wherein each mg of the particles contains between 22,000 and 73,000 microspheres, and wherein the particles have a specific activity ranging from 0.0231 to 0.05 GBq/mg when administered.

* * * * *